(12) United States Patent
Guthke et al.

(10) Patent No.: US 8,590,846 B2
(45) Date of Patent: Nov. 26, 2013

(54) DEVICE FOR LAYING A CABLE HARNESS IN AN AIRCRAFT

(75) Inventors: Hans-Peter Guthke, Buxtehude (DE); Lueder Kosiankowski, Harsefeld (DE); Martin Schnoor, Kaltenkirchen (DE); Andreas Jacobi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 280 days.

(21) Appl. No.: 12/788,703

(22) Filed: May 27, 2010

(65) Prior Publication Data

US 2010/0301177 A1     Dec. 2, 2010

Related U.S. Application Data

(60) Provisional application No. 61/181,381, filed on May 27, 2009.

(30) Foreign Application Priority Data

May 27, 2009    (DE) .......................... 10 2009 022 796

(51) Int. Cl.
*F16L 3/22*      (2006.01)

(52) U.S. Cl.
USPC ............. 248/68.1; 248/75; 248/62; 248/74.4; 174/74 R

(58) Field of Classification Search
USPC ........ 248/75, 56, 62, 50, 51, 53, 63, 48.1, 55, 248/52, 59, 60, 67.5, 67.7, 74.4, 79; 174/146, 28, 27, 68.1, 68.3, 72 A, 88 R, 174/40 CC, 95, 74 R; 24/16 R; 361/826; 211/26
See application file for complete search history.

(56) References Cited

U.S. PATENT DOCUMENTS

| | | | | |
|---|---|---|---|---|
| 2,404,110 | A | * | 7/1946 | Trafton .................... 248/74.3 |
| 3,716,650 | A | * | 2/1973 | de Mecquenem ............. 174/42 |
| 4,183,691 | A | | 1/1980 | Van Melle |
| 4,369,947 | A | * | 1/1983 | Kuwano ................... 248/74.2 |
| 4,647,241 | A | * | 3/1987 | Weber ........................ 403/18 |
| 5,091,604 | A | * | 2/1992 | Kirma .......................... 174/2 |
| 5,267,337 | A | * | 11/1993 | Kirma ......................... 385/75 |
| 5,388,790 | A | * | 2/1995 | Guthke et al. ................. 248/58 |

(Continued)

FOREIGN PATENT DOCUMENTS

| | | |
|---|---|---|
| DE | 41 03 237 C1 | 5/1992 |
| DE | 102004011182 A1 | 10/2005 |
| WO | 2007039228 A1 | 4/2007 |

*Primary Examiner* — Terrell McKinnon
*Assistant Examiner* — Monica Millner
(74) *Attorney, Agent, or Firm* — Leydig, Voit & Mayer, Ltd.

(57) ABSTRACT

A device for bridging a cable harness between two aircraft structure elements of an aircraft includes an elongated connecting rod having a plurality of radial snap-in holes and configured to bridge a space between the two aircraft structure elements and affix to at least one of the two aircraft structure elements. The device also includes a cable guiding element having at least one receiving section for receiving the cable harness and at least one attachment section circumferentially surrounding the connecting rod, the attachment section having a resiliently held radially directed locking pin, wherein the locking pin corresponds to one of the plurality of the radial snap-in holes so as to form a clip connection and a positive locking engagement between the at least one attachment section and the connecting rod.

14 Claims, 2 Drawing Sheets

(56) References Cited

U.S. PATENT DOCUMENTS

| | | | |
|---|---|---|---|
| 5,399,812 A * | 3/1995 | Woszczyna et al. | 174/97 |
| 5,673,878 A * | 10/1997 | Yamate et al. | 248/65 |
| 6,079,673 A * | 6/2000 | Cox | 248/63 |
| 6,080,933 A * | 6/2000 | Gretz | 174/668 |
| 6,274,813 B1 * | 8/2001 | Houte et al. | 174/68.3 |
| 6,291,770 B1 * | 9/2001 | Casperson | 174/72 A |
| 6,367,211 B1 * | 4/2002 | Weener et al. | 52/220.1 |
| 6,604,400 B1 * | 8/2003 | Gretz | 72/334 |
| 6,672,628 B2 * | 1/2004 | Thomas et al. | 285/320 |
| 7,090,127 B2 * | 8/2006 | Rotta | 235/384 |
| 7,135,790 B2 * | 11/2006 | Fondriest | 307/147 |
| 7,290,739 B2 * | 11/2007 | Zeuner et al. | 248/68.1 |
| 7,419,124 B2 * | 9/2008 | Zeuner et al. | 248/68.1 |
| 7,500,644 B2 * | 3/2009 | Naudet et al. | 248/68.1 |
| 7,607,369 B2 * | 10/2009 | Cox et al. | 74/502.6 |
| 7,686,259 B2 * | 3/2010 | Caveney et al. | 248/68.1 |
| 7,740,209 B2 * | 6/2010 | Neumann et al. | 248/49 |
| 7,784,743 B2 * | 8/2010 | Zeuner et al. | 248/63 |
| 8,240,620 B2 * | 8/2012 | Walter | 248/68.1 |
| 2004/0177988 A1 * | 9/2004 | Kiely | 174/65 R |
| 2008/0053680 A1 * | 3/2008 | Kiely et al. | 174/70 R |
| 2009/0026322 A1 * | 1/2009 | Neumann et al. | 248/49 |
| 2009/0026327 A1 | 1/2009 | Zeuner et al. | |
| 2009/0101765 A1 * | 4/2009 | Caveney | 248/68.1 |
| 2009/0200062 A1 * | 8/2009 | Aoki | 174/136 |
| 2010/0139948 A1 * | 6/2010 | Smallhorn | 174/135 |
| 2010/0238642 A1 * | 9/2010 | Le Louarn et al. | 361/825 |

\* cited by examiner

DEVICE FOR LAYING A CABLE HARNESS IN AN AIRCRAFT

CROSS REFERENCE TO PRIOR APPLICATIONS

Priority is claimed to German Application No. DE 10 2009 022 796.2, filed May 27, 2009 and to U.S. Provisional Application No. 61/181,381, filed May 27, 2009. The entire disclosure of both applications is incorporated by reference herein.

The invention relates to a device for laying a cable harness in an aircraft at an aircraft structure that is to be bridged, wherein at least one cable guiding element that comes into contact with the cable harness is provided with at least one receiving section for the cable harness, as well as with at least one attachment section for affixation to the aircraft structure, which attachment section forms a receiving device for one end of an elongated connecting rod for bridging the aircraft structure, which connecting rod is affixed to the aircraft structure in the direction of the cable harness.

The field of application of the present invention predominantly relates to the construction of commercial aircraft for the transport of passengers or cargo. Within the fuselage of such aircraft, which as a rule are large-bodied aircraft, there are pipelines and the electrical cable harnesses that are of particular interest in the context of the present invention. Such cable harnesses comprise electrical voltage supply lines or control lines, which form part of electrical bus systems for aircraft-internal communication of electrical devices and the like. The cable harnesses used for this purpose comprise bundles of individual insulated metal wires or stranded metal wires, which bundles are up to several centimeters in diameter. Most of the time the cable harness comprises separate external insulation for protection against mechanical and climatic influences. When viewed from the interior of the cabin, the cable harnesses are laid between the outer aircraft surface and the interior of the cabin so as to be out of sight. This is the region of the aircraft structure that comprises various reinforcement members and frame elements, which aircraft structure, as a rule, comprises openings for feeding the harnesses through in order to lay said harnesses along the aircraft fuselage.

BACKGROUND

DE 10 2004 011 182 A1 describes a technical solution for laying an electrical cable harness along an aircraft structure that is to be bridged. A beam of the aircraft structure comprises an opening through which the cable harness is to extend. In this arrangement direct contact between the electrical cable harness and the edge region of the opening is to be avoided in order to prevent the electrical cable harness from being chafed, which would be associated with the risk of short-circuits occurring. For this purpose a cable guiding element is provided in the region of the opening. The cable guiding element essentially comprises a V-shaped receiving section for the cable harness. The cable harness is affixed to said receiving section by means of conventional cable ties. For attachment to the aircraft structure the cable guiding element comprises an attachment section by means of which the cable guiding element can be clamped, without the need for separate connecting means such as screws and the like, by way of a clamping effect, to an associated opening adjacent to the above-mentioned recess of the beam.

While with such a cable guiding element damaging contact between the cable harness and the aircraft structure is avoided, in particular in large-body aircraft fuselages the distance between individual beams that extend parallel to each other is, however, so large that such individual cable guiding elements cannot ensure adequate guidance of the cable harness.

From the generally known state of the art therefore a bar-shaped bridging device for cable harnesses to be laid is known, which bridging device additionally guides the cable harness in the region between two beams. Usually such a device comprises several individual cable guiding elements with a conventional receiving section for the cable harness; however, on the attachment section a receiving device for the end of an elongated connecting rod for bridging the aircraft structure is provided. By stringing together individual cable guiding elements with connecting rods a large distance between beams of the aircraft structure can safely be bridged, and the cable harness is reliably guided in this region. This bridging device is affixed to beams of the aircraft structure by way of the two connecting rods situated on the outside, for example by means of a screw-connection arrangement.

The known bridging device for laying a cable harness is associated with a disadvantage in that it involves very considerable installation expenditure. This is because the individual cable guiding elements are usually bonded to the ends of the associated connecting rods. Bonding requires sufficient time for curing, which increases production-related expenditure. Furthermore, additional installation devices are required in order to affix the connecting rods including the cable guiding elements during the curing period in the desired position. Moreover, in the known bonding solution there is a risk of undesirable chafing points forming as a result of cured adhesive residues in the region of the connecting point towards the cable harness.

SUMMARY OF THE INVENTION

An aspect of the present invention is to provide a device for laying a cable harness in an aircraft at an aircraft structure that is to be bridged, which device can be installed in a simple manner and involving little expenditure of time while ensuring safe affixation of the cable harness.

The invention encompasses the technical teachings according to which the connection between the connecting rod and the cable guiding element affixed to it is designed in the manner of a clip connection which comprises at least one resiliently-held radially directed locking pin and a corresponding radial snap-in hole, which together establish a positive-locking engagement.

An advantage of the solution according to the invention results from not using an integral connection for attaching the connecting rod to a cable guiding element, and is based on the recognition that the cable guiding element can serve as a type of adapter piece for connecting rods that are to be strung together. This opens up the possibility of creating laying devices for cable harnesses of any desired length with the use of a type of modular principle. Production-related expenditure is reduced correspondingly, and the solution according to the invention can be installed within a very short time. There is no longer any excessive adhesive residue at the connecting positions, and thus any occurrence of potential chafing points on the cable harness is altogether avoided. Likewise, no installation devices for construction of the solution according to the invention are needed. Tests have shown that coupling based on the principle of a clip connection of the connecting rod to the cable guiding element to be attached thereto provides adequate stability to safely guide even larger-diameter electrical cable harnesses in a bridging manner along the aircraft structure. By pairing at least one radial snap-in hole with an associated resiliently-held locking pin the solution according to the invention can also be dismantled in a simple manner if required.

According to a measure that improves the invention, it is proposed that an attachment eyelet element for attachment to the aircraft structure be provided, which attachment eyelet element, by way of a clip connection of the same type, is likewise attached to the associated end of the connecting rod. Normally each laying device comprises several cable guiding elements that are strung together in an alternating manner with connecting rods. At the ends the laying device comprises the attachment eyelet elements as stated, which preferably comprise an eyelet section. Screwing the laying device to the aircraft structure, which to this extent is designed as a detachable attachment and is thus advantageously also designed so as to be de-installable, takes place by way of the opening created by the eyelet section. The use of the same type of clip connection between the attachment eyelet element and the connecting rod, as well as between the cable guiding element and the connecting rod, ensures a uniform modular system and to this extent also good interchangeability of the individual components.

In order to implement the above-mentioned alternating stringing together of connecting rods of different lengths with cable guiding elements as coupling pieces, it is proposed that a cable guiding element comprise exactly two coaxially opposite attachment sections, each comprising a receiving device for respectively associated connecting rods. These receiving devices are preferably pot-shaped, wherein the clip connection means are arranged in the wall region of the receiving devices. As a result of this pot-shaped design a defined insertion depth for the end of the connecting rod is created, and consequently the corresponding clip connection means can in a simple manner be made to coincide so that snap-in engagement can quickly be established. It is also imaginable to string together two or several cable guiding elements directly with different radial alignment to the associated attachment sections for the cable harness so that each laying device guides several cable harnesses side by side in a bridging manner in the aircraft structure. In this arrangement these several cable guiding elements can also be clipped together within the framework of the modular system, or they can be present in a single piece as a component of the modular system.

According to a measure that improves the clip connection of the laying device according to the invention, it is proposed that the locking pin be arranged on a resilient tongue of the cable guiding element and/or of the attachment eyelet element in the region of the pot-shaped recess in order to receive the associated end of the connecting rod. In this way the clip connection, which requires resilient holding by the locking pin, can be made in a single piece in which preferably the resilient tongue partially extends along the circumference of the receiving-eyelet-like attachment element. From the point of view of production, this can be implemented in that the resilient tongue that extends in circumferential direction is formed by a U-shaped slit in the receiving region of the attachment eyelet element or of the cable guiding element.

In order to achieve improved stability of the clip connection, according to another measure that improves the invention it is proposed that in a cable guiding element or attachment eyelet element in the receiving region of the connecting rod precisely two opposite locking pins that are resiliently-held be provided, with each locking pin engaging snap-in holes formed by both openings of the through-hole. Of course, it is also imaginable to arrange more than two locking pins in this manner along the circumference of the cable guiding element or the attachment eyelet element, wherein it must be ensured that the length of the resilient tongue is adequate to exert the desired spring effect on the locking pin. Experiments have shown that with the given diameters and load forces two locking pins for each clip connection are adequate to provide reliable attachment.

In order to facilitate installation of the connecting rod in the associated recess on the side of the cable guiding element or of the attachment element, it is proposed that the locking pin comprise an inlet slope for snap-in axial insertion of the end of the connecting rod, wherein the locking pin in the installed position snaps into the corresponding snap-in hole. The locking pin thus need not be moved, with the use of an additional tool, to a home position ready to be received before insertion of the connecting rod takes place. Instead, as a result of this inlet slope, when the connecting rod is inserted into the associated receiving device of the cable guiding element or attachment eyelet element, the locking pin is automatically pretensioned in a radially-outward manner.

In a simple manner the snap-in hole that is associated with the locking pin, on the side of the connecting rod, can be designed as a radial through-hole in the end region of the connecting rod. In this way two opposing openings for engagement by respectively associated locking pins can be produced by means of just one single hole.

Furthermore, it is proposed that the connecting rod be designed in a tubular manner with a round cross section and be made in the continuous-extrusion process. Stable plastics or light metals are materials suitable for this purpose. As a result of the tubular design the connecting rod is hollow, which as a result of its shape provides good geometrical moment of inertia that resists undesirable bending. Furthermore, a connecting rod designed in this manner is particularly light in weight, which is in line with the objective of saving weight in aircraft construction.

In contrast to this, the cable guiding element and the attachment eyelet element are preferably made from a cast thermoplastic material, for example from polyethylene (PE), polypropylene (PP), glass-fibre-reinforced plastic (GFP) or other suitable materials that provide adequate dimensional stability and at the same time are also suitable for the clip connection according to the invention. The proposed materials provide adequate heat resistance, and a resilient tongue with adequate spring effect can be created for the locking pins.

BRIEF DESCRIPTION OF THE DRAWINGS

Further measures that improve the invention are stated in the dependent claims or are shown in more detail below, together with the description of a preferred exemplary embodiment of the invention with reference to the figures. The following are shown:

DETAILED DESCRIPTION

Figure 1:
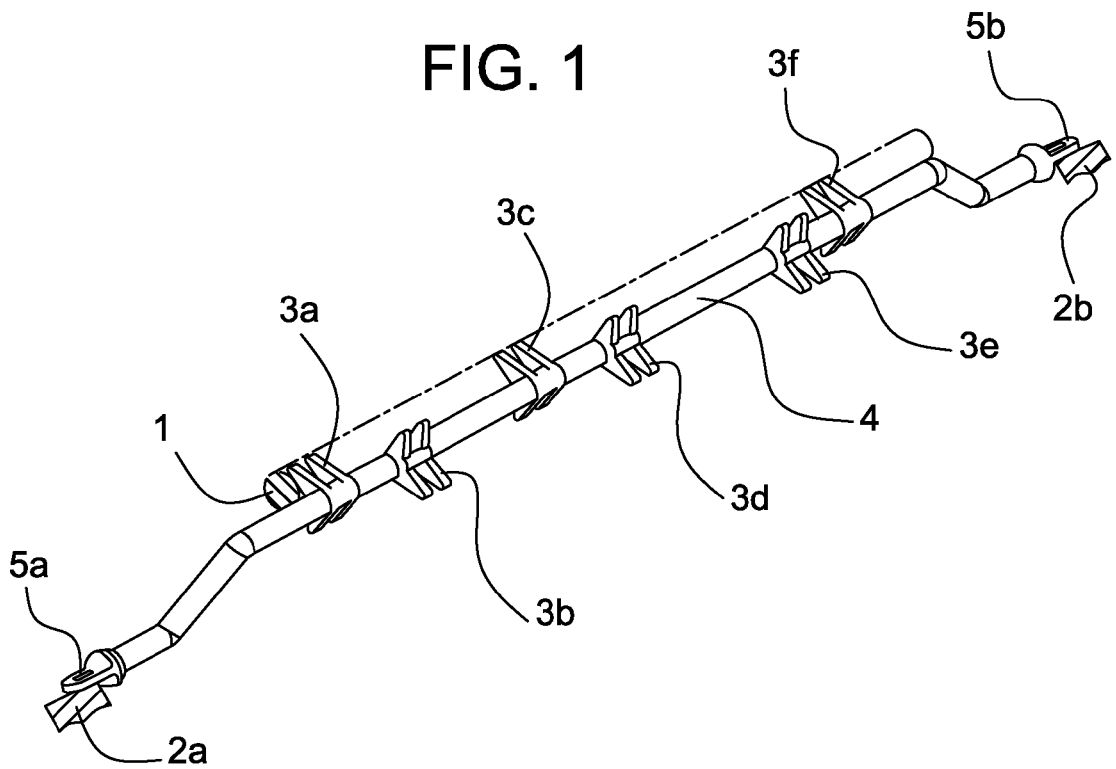
FIG. 1 a perspective view of a device for laying a cable harness in an aircraft at an aircraft structure that is to be bridged, FIG. 2 a perspective view of an exemplary cable guiding element, FIG. 3 a perspective view of an exemplary attachment eyelet element, and FIG. 4 a partial section of a clip connection established between the attachment eyelet element and the connecting rod.

According to FIG. 1 the laying device for a cable harness 1 that in the illustration is only shown diagrammatically along an aircraft structure 2a and 2b that is also only shown diagrammatically that comprises two beams that are spaced apart from each other and extend parallel to each other comprises stringing together individual cable guiding elements 3a to 3f with connecting rods 4 (shown as examples) that respectively connect the former.

In order to attach the ends of the laying device to the aircraft structure 2a and 2b, attachment eyelet elements 5a and 5b that are associated with the ends of the laying device are provided.

The connection of the individual connecting rods 4 to the cable guiding elements 3a to 3f and to the attachment eyelet elements 5a and 5b on the ends is via clip connection.

Figure 2:
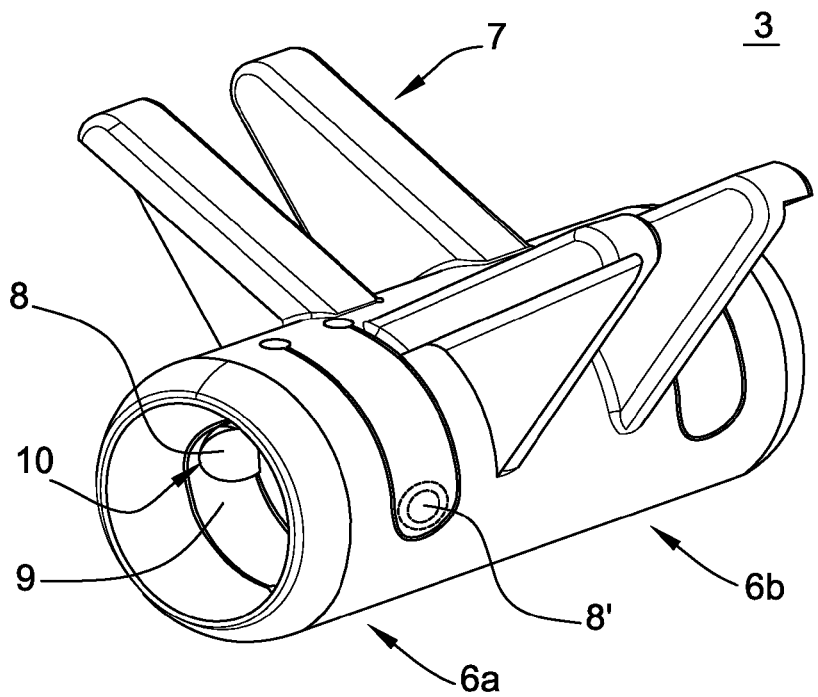

According to FIG. 2 this clip connection on the cable guiding element 3 (as an example) is placed in the region of two coaxially opposing attachment sections 6a and 6b for receiving respectively associated connecting rods. Apart from these attachment sections 6a and 6b the cable guiding element 3 comprises a V-shaped receiving section 7 to affix the cable harness 1 with the aid of cable ties.

The locking pin 8, which in order to establish the clip connection on the attachment section 6a (as an example) is provided in the cable guiding element 3, on the distal end of a resilient tongue 9 is formed so as to be protruding radially-inwards. The locking pin 8 comprises an inlet slope 10 for snap-in axial insertion of the end of the connecting rod. For each clip connection at each attachment section 6a and 6b pairing of two opposing and resiliently-held locking pins 8, 8' is provided.

Figure 3:
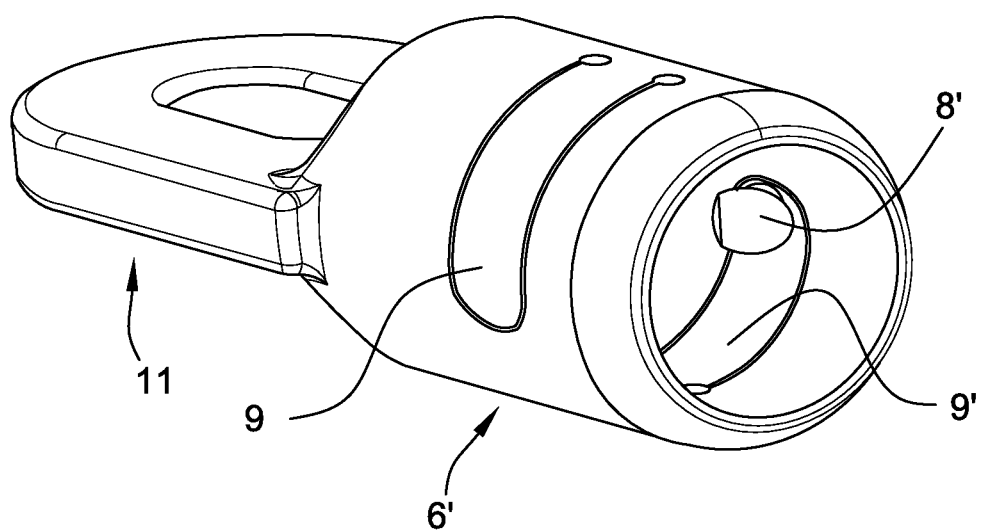

According to FIG. 3, on the attachment eyelet element, too, there is an attachment section 6' that is comparable to the attachment section described above. The attachment eyelet element 5 further comprises an eyelet section 11 that makes it possible to affix the entire laying device to the aircraft structure by way of a screw connection.

The two resilient tongues 9 and 9', each comprising respectively associated opposing locking pins 8, are formed by U-shaped slits that extend partially along the circumference in the region of the attachment section 6'.

The attachment eyelet element 5 shown, as well as the cable guiding element 3 explained above in FIG. 2, comprises a plastic material and is made by injection moulding. In the injection moulding process the U-shaped slit can be made so as to shape the resilient tongue 9 and 9'.

Figure 4:
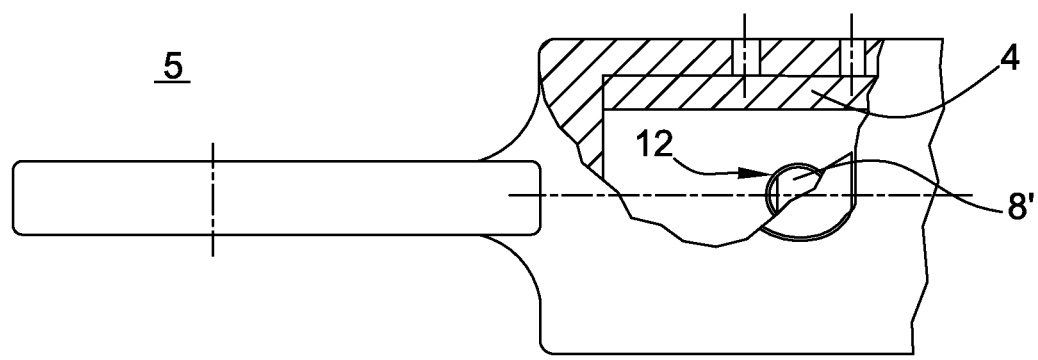

According to FIG. 4, in the installed state, in other words after insertion of the end of the connecting rod 4 into the attachment section 6', the locking pin 8' engages a corresponding snap-in hole 12 that has been made as a through-hole in the connecting rod 4.

The connecting rod 4 is designed so as to be tubular with a round cross section, and in this exemplary embodiment comprises an extruded plastic material.

The invention is not limited to the preferred embodiment described above. Instead, modifications thereof are imaginable that fall within the scope of protection of the following claims. For example, it is also possible to clip together a lesser number or a greater number of connecting rods 4 by linking them together, by way of corresponding cable guiding elements, to form a laying device of any quantity by way of the clip connection according to the invention, wherein the main advantage of a modular system is due to the uniform clip connection.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Cable harness
2 Aircraft structure
3 Cable guiding element
4 Connecting rod
5 Attachment eyelet element
6 Attachment section
7 Receiving section
8 Locking pin
9 Resilient tongue
10 Inlet slope
11 Eyelet section
12 Snap-in hole

What is claimed is:

1. A device for bridging a cable harness between two aircraft structure elements of an aircraft, the device comprising:
an elongated connecting rod having a plurality of radial snap-in holes disposed in an outer circumferential wall of the connecting rod and configured to at least partially bridge a space between the two aircraft structure elements and to affix to at least one of the two aircraft structure elements; and
a cable guiding element having at least one receiving section for receiving the cable harness and at least one attachment section circumferentially surrounding the connecting rod, the attachment section having a locking pin disposed radially relative to the connecting rod in a resilient manner so as to snap into and form a positive locking engagement with a corresponding one of the plurality of radial snap-in holes via axial insertion of the connecting rod into the at least one attachment section,
wherein each of the plurality of snap-in holes is a radial through-hole at an end region of the rod.

2. The device as recited in claim 1, wherein the eyelet section is configured to detachably attach one of the two the aircraft structure elements via a screw connection.

3. The device as recited in claim 1, wherein the at least one attachment section includes two coaxially opposite disposed attachment sections each receiving a corresponding connecting rod.

4. The device as recited in claim 1, wherein the at least one attachment section includes a resilient tongue, the locking pin being disposed on the resilient tongue.

5. The device as recited in claim 1, wherein the eyelet attachment element includes an eyelet resilient tongue, the eyelet locking pin being disposed on the eyelet resilient tongue.

6. The device as recited in claim 1, wherein the locking pin includes an inlet slope such that a height of the pin increases with increasing distance from an inlet of the attachment section for receiving the connecting rod.

7. The device as recited in claim 1, wherein the at least one attachment section includes a further locking pin disposed opposite the locking pin, and wherein the locking pin and the further locking pin each engage in one of the plurality of snap-in holes so as to form the clip connection.

8. The device as recited in claim 5, wherein the eyelet resilient tongue extends along a circumference of the at least one eyelet attachment section in a recess of the eyelet attachment section and forms a U-shaped slit with the at least one eyelet attachment section.

9. The device as recited in claim 1, wherein the connecting rod is tubular with a round cross section and is extruded.

10. The device as recited in claim 1, wherein the at least one receiving section includes a V-shaped section so as to ensure centering contact of the cable harness.

11. The device as recited in claim 10, wherein the cable harness is an essentially circular bundle of individual cables.

12. The device as recited in claim 1, wherein the at least one cable guiding element, the eyelet attachment element and the connecting rod each include a cast thermoplastic material.

13. A device for bridging a cable harness between two aircraft structure elements of an aircraft, the device comprising:
an elongated connecting rod having a plurality of radial snap-in holes disposed in an outer circumferential wall of the connecting rod and configured to at least partially bridge a space between the two aircraft structure elements and to affix to at least one of the two aircraft structure elements;
a cable guiding element having at least one receiving section for receiving the cable harness and at least one attachment section circumferentially surrounding the connecting rod, the attachment section having a locking pin disposed radially relative to the connecting rod in a resilient manner so as to snap into and form a positive locking engagement with a corresponding one of the plurality of radial snap-in holes via axial insertion of the connecting rod into the at least one attachment section; and
an eyelet attachment element having an eyelet section configured to attach the connecting rod to one of the two aircraft structure elements and a connecting rod attachment element circumferentially surrounding the connecting rod and having an eyelet locking pin disposed radially relative to the connecting rod in a resilient manner so as to snap into and form a further positive locking engagement with a corresponding, further one of the plurality of snap-in holes via axial insertion of the connecting rod into the at least one attachment section.

14. A device for bridging a cable harness between two aircraft structure elements of an aircraft, the device comprising:
an elongated connecting rod having a plurality of radial snap-in holes disposed in an outer circumferential wall of the connecting rod and configured to at least partially bridge a space between the two aircraft structure elements and to affix to at least one of the two aircraft structure elements; and
a cable guiding element having at least one receiving section for receiving the cable harness and at least one attachment section circumferentially surrounding the connecting rod, the attachment section including a resilient tongue, a locking pin being disposed on the resilient tongue, the locking pin being disposed radially relative to the connecting rod in a resilient manner so as to snap into and form a positive locking engagement with a corresponding one of the plurality of radial snap-in holes via axial insertion of the connecting rod into the at least one attachment section, the resilient tongue extending along a circumference of the at least one attachment section in a recess of the at least one attachment section and forming a U-shaped slit with the at least one attachment section.

* * * * *